United States Patent
Murray, Jr.

(10) Patent No.: US 7,938,970 B2
(45) Date of Patent: May 10, 2011

(54) METHOD FOR CLARIFYING WATER

(76) Inventor: John J. Murray, Jr., West Palm Beach, FL (US)

(*) Notice: Subject to any disclaimer, the term of this patent is extended or adjusted under 35 U.S.C. 154(b) by 441 days.

(21) Appl. No.: 12/106,398

(22) Filed: Apr. 21, 2008

(65) Prior Publication Data

US 2009/0260989 A1    Oct. 22, 2009

(51) Int. Cl.
*C02F 1/58* (2006.01)
*C02F 101/10* (2006.01)

(52) U.S. Cl. ........ 210/705; 205/742; 205/751; 210/712; 210/716; 210/748.18; 210/906

(58) Field of Classification Search .............. 210/717
See application file for complete search history.

(56) References Cited

U.S. PATENT DOCUMENTS

| | | | | |
|---|---|---|---|---|
| 3,414,497 | A | * 12/1968 | Kanai | ............................ 205/758 |
| 4,011,151 | A | * 3/1977 | Ito et al. | ........................ 205/751 |
| 4,104,159 | A | * 8/1978 | Kanai | ............................ 210/667 |
| 6,165,369 | A | 12/2000 | Tanis et al. | |
| 6,350,383 | B1 | 2/2002 | Douglas | |
| 6,797,179 | B2 | * 9/2004 | Arnaud | ........................ 210/709 |
| 6,881,346 | B2 | 4/2005 | Landis et al. | |
| 6,960,303 | B2 | 11/2005 | Landis et al. | |
| 7,001,534 | B2 | 2/2006 | Landis et al. | |
| 7,063,804 | B2 | 6/2006 | Landis et al. | |
| 7,252,843 | B2 | 8/2007 | Moore et al. | |
| 7,329,356 | B2 | * 2/2008 | Brady | .......................... 210/712 |
| 7,374,655 | B2 | * 5/2008 | Roberts et al. | ................ 205/701 |
| 2003/0213752 | A1 | 11/2003 | Landis et al. | |
| 2003/0213753 | A1 | 11/2003 | Landis et al. | |

* cited by examiner

*Primary Examiner* — Peter A Hruskoci
(74) *Attorney, Agent, or Firm* — John C. Smith

(57) ABSTRACT

An apparatus and method of producing and using aluminum slurry containing aluminum particles having an extremely small size. In particular, a particle size that is small enough to freely flow through water filtration filters. Once the aluminum particles react with phosphorus, phosphates, and other contaminants, the resulting particles are large enough to be trapped by filters such that the contaminants can be easily removed. The aluminum slurry is created by the use of a unique process which rapidly transforms electrically charged aluminum plates into slurry. The resulting slurry is then added to the body of water where it disperses throughout the water and flocculates with the contaminants. The resulting clumps produced by the reaction are large enough to be trapped by filters in the water treatment facility.

7 Claims, 3 Drawing Sheets

METHOD FOR CLARIFYING WATER

BACKGROUND

1. Technical Field

This invention relates in general to a water clarification system. In particular, it relates to an apparatus and method of treating excessive algae growth by removing phosphorus-based contaminants, such as phosphates, from water.

2. Background of the Invention

An undesirable result of the use of agricultural products, such as fertilizers, is the unintended side effects related to their use. One serious side effect of fertilizers is the residual phosphorus which remains in the environment as a result of fertilizer use. In particular, large-scale use of fertilizer has caused significant environmental contamination. Contamination occurs in this manner: excess phosphorus is deposited in water runoff which eventually penetrates ground water, rivers, and lakes. This phosphorus promotes algae growth. In turn, the thriving algae growth creates an environment where water becomes murky, discolored, and filled with a variety of suspended particles. As a result, any fish or other organisms living in the water are adversely affected.

In addition to the environment in general, contained artificial water environments, such as Koi ponds, aquariums, swimming pools, can be especially susceptible to damage due to a lack of a flow of clean water. Koi ponds and aquariums are normally plagued with green, murky and often smelly water which defeats the whole purpose of enjoying the hobby.

There are numerous problems associated with poor water clarity and Quality. For example, the water may contain high levels of ammonia, nitrite and nitrate, it may have low levels of oxygen. The effect of this contamination is that it can adversely affect the skin and gills of fish, which in turn can create a stressful and unhealthy condition for fish. These contaminants can also make the water look green, murky, and can produce an unpleasant odor. As a result, maintaining the quality of the water may require constant water changes.

One solution to this problem is to attempt to remove the end result of the contamination, namely the algae, from the water using algaecide. While this will produce temporary improvement, it is not an effective or convenient way to address the problem. For example, the use of an algaecide may reduce the amount of algae in the water, but the chemicals in the algaecide may create other problems. It would be desirable to have a method of eliminating algae without the addition of harmful chemicals to the water.

Another approach to this problem has been an attempt to eliminate the cause of a rapid algae growth in water, rather than directly limit the amount of algae growth in the water. In particular, efforts have been made to develop methods of extracting phosphorus from water for the purpose of eliminating the material that is encouraging and facilitating rapid algae growth. It has been found that aluminum can be useful when attempting to reduce the amount of phosphorus in water. A number of products have been developed in an attempt to provide a material which would react with the phosphorus in the water for the purpose of eliminating it. One such attempt has been the development of alum pellets which are deposited in the water, and which react with the phosphorus over time. Unfortunately, the use of solid alum pellets has some disadvantages. In particular, these pellets sink to the bottom of the water and remain there while the slow process of reacting with the phosphorus takes place. It would be desirable to have a product which spreads uniformly through the water for the purpose of acting quickly and effectively without the inherent time delays associated with alum pellets.

Another approach to the problem has been the development of suspensions of aluminum salts, such as aluminum sulfate, as another method of reacting with phosphorus in the water. The problem associated with this method, as well as with the use of alum pellets, is that the aluminum particles given off by these methods tend to be large and are ineffective because they have difficulty flowing through filters in a water treatment system. It would be desirable to have a method of providing aluminum in an extremely fine size so that it can disperse and travel freely through a water filtration system.

While the prior art has attempted to address the problem of turbidity, discoloration, and particle contamination due to excessive algae growth in bodies all contained water, it has failed to provide a method of uniformly distributing aluminum throughout the body of water, and distributing aluminum in particle sizes small enough to freely flow through water filtration systems.

SUMMARY OF THE INVENTION

This invention provides a method of producing and using aluminum slurry which contains aluminum particles having an extremely small size. In particular, it produces a particle size that is small enough to freely flow through water filtration filters. Once the aluminum particles react with phosphorus, phosphates, and other contaminants, it forms particles large enough to be trapped by filters such that the contaminants can be easily removed. The aluminum slurry is created by the use of a unique device which rapidly transforms electrically charged aluminum plates into slurry. The resulting slurry is then added to the body of water where it disperses throughout the water and flocculates with the contaminants. The resulting clumps produced by the reaction are large enough to be trapped by filters in the water treatment facility.

DETAILED DESCRIPTION OF THE PREFERRED EMBODIMENT

Prior to a discussion of the figures, an overview of the invention will be presented. The invention provides a method of creating and using extremely small particles of aluminum to remove contaminants from water.

The first step in the process is to create a slurry containing aluminum particles in suspension. The slurry is created by placing an aluminum plate assembly containing multiple aluminum plates into a tank of water. Electrical connections are attached to the outer plates and the aluminum plate assembly is left submerged. The electrical charge dissolves the submerged aluminum plates over a period of time.

Once the slurry is produced, excess water is removed, and the slurry is now available for use with contained bodies of water. The slurry is poured into the water and mixes with the water such that it is distributed throughout the body of water. An advantage associated with the use of the slurry is that the particles are small enough to freely move through filtration systems. As the particles come in contact with contaminants such as phosphates, they react with the phosphates and function as a flocculant. The resulting large clumps are of sufficient size to be trapped by the water filtration system.

When the slurry is used in combination with a filtration system, the water is clean rapidly and efficiently. However, the invention does not require a filtration system to work. In the absence of a filtration system, the population process will result in clumps of material which either float to the surface, or sink to the bottom of the contained body of water. In addition, another advantage provided by the invention is that once the phosphorus-based materials combine with the aluminum, the resulting particles are no longer suitable for sustaining algae growth. As a result, the undesirable algae is starved of its food source and the contained body of water remains cleaner for longer periods of time. However, the ability to disperse finely sized particles of aluminum throughout a body of water, and then passing the water through a filtration system, will result in a much more rapid dispersal, and a much more rapid cleanup of the water.

Having discussed an overview of the invention, we turn now to a detailed discussion of the drawings.

Figure 1:
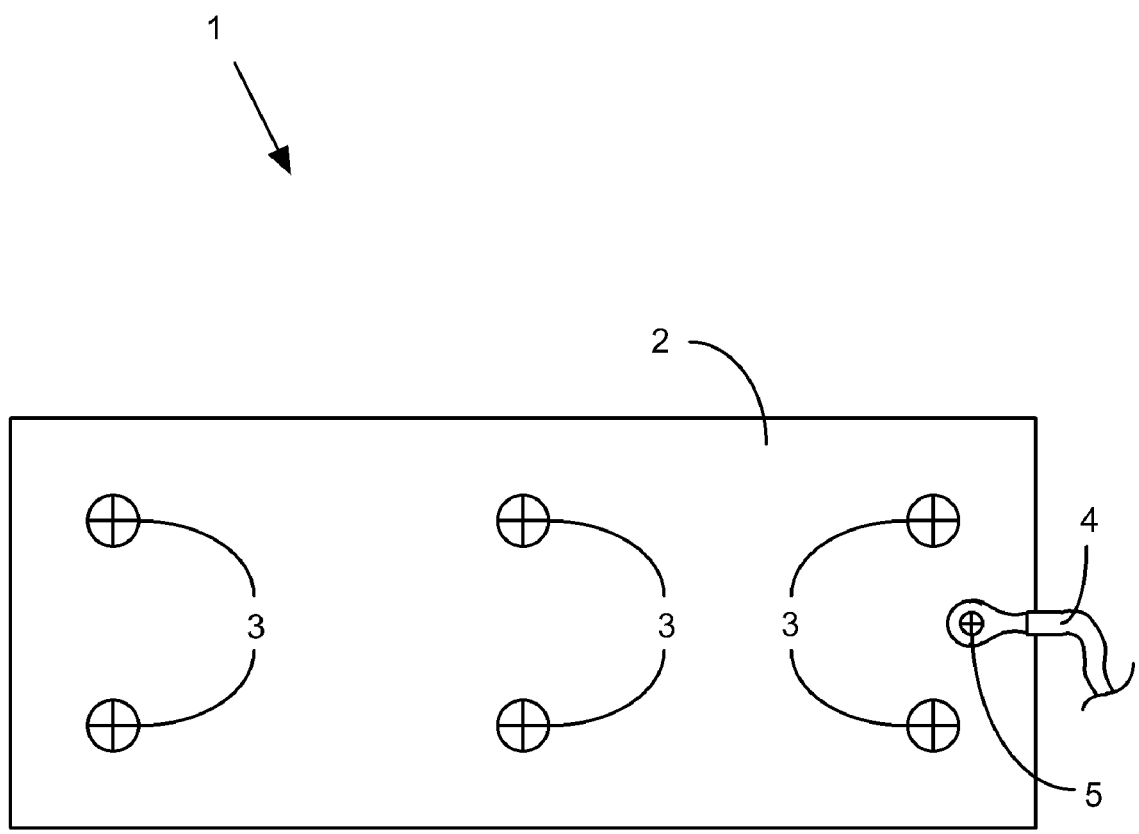
FIG. 1 is a side view of a preferred embodiment of the invention which shows an aluminum plate assembly with an electrical connection secured to one plate.

FIG. 1 is a side view of a preferred embodiment of the invention which shows an aluminum plate assembly 1 with an electrical connection 4 providing voltage and secured to an outside aluminum plate 2 by an electrical connector 5. Insulated plate connectors 3 are shown attached to the outside of aluminum plate 2. The plate connectors 3 are used to secure multiple aluminum plates 2 together to form the aluminum plate assembly 1.

Figure 2:
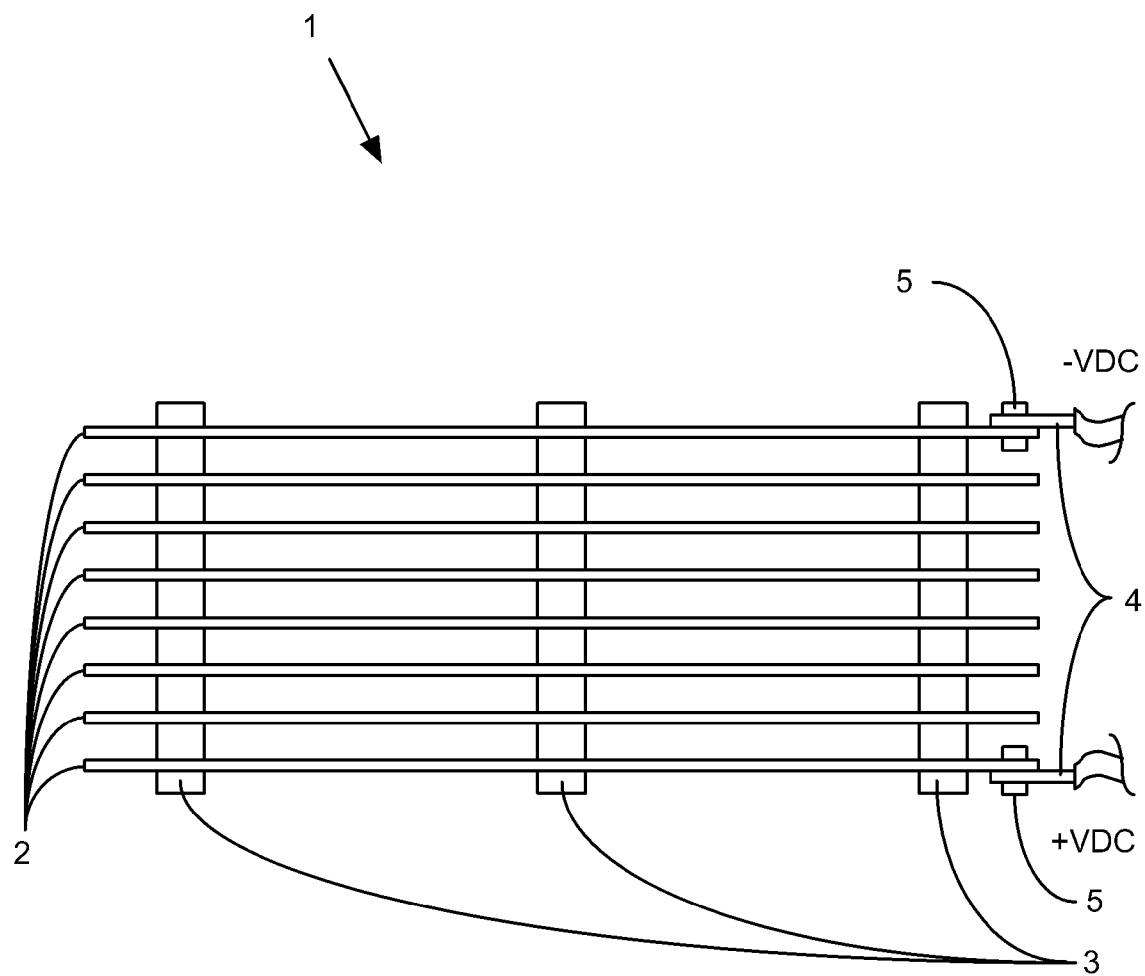
FIG. 2 is a top view of a preferred embodiment of the aluminum plate assembly used by the invention. The figure illustrates a plurality of plates secured together, and separated from one another. Electrical connections are shown attached to the outside plates on either side of the aluminum plate assembly.

FIG. 2 is a top view of a preferred embodiment of the aluminum plate assembly 1 used by the invention. This figure illustrates a plurality of aluminum plates 2 secured together, and separated from one another, by insulated plate connectors 3. Electrical connections 4 are shown attached to the outer aluminum plates 2 on either side of the aluminum plate assembly 1.

Figure 3:
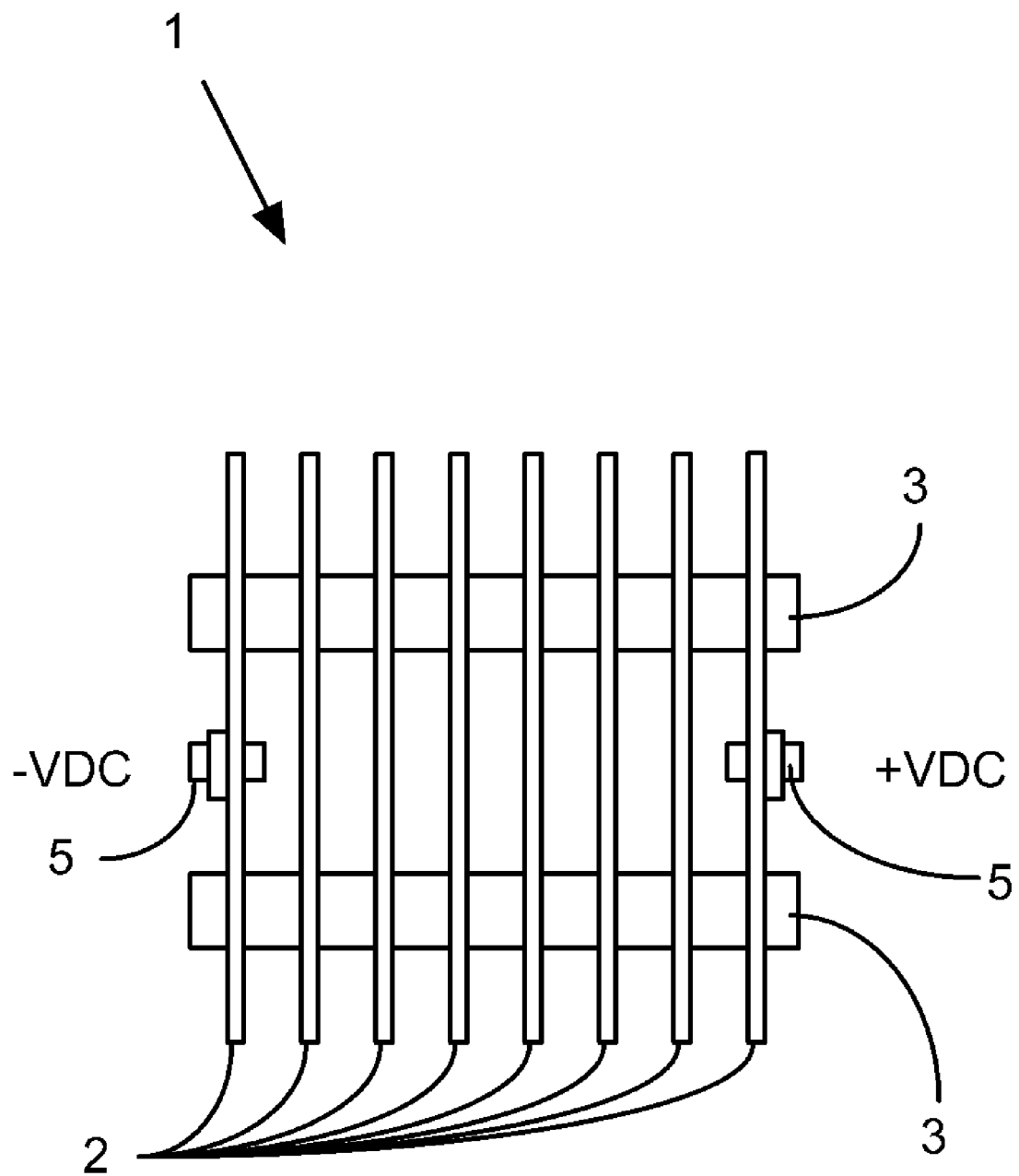
FIG. 3 is an edge side view of a preferred embodiment of the invention which illustrates the electrical connections coupled to the outside plates on the aluminum plate assembly.

FIG. 3 is an edge side view of a preferred embodiment of the invention which illustrates the electrical connectors 5 coupled to the outer aluminum plates 2 on the aluminum plate assembly 1.

The foregoing figures use a particular structure for illustrative purposes. However, those skilled in the art will recognize that the purpose of the aluminum plate assembly 1 is to provide a substantial surface area to facilitate dissolving the aluminum plates 2. The actual shape of the aluminum plates 2 can vary, as well as the overall size of the aluminum plate assembly 1. In fact, the overall size will vary depending on the volume of slurry which is desired.

Using the example illustrated in FIGS. 1-3, the process starts with eight aluminum plates 2, each aluminum plate 2 is 16 inches long and 8 inches wide, cut from a sheet of aluminum. The aluminum plates 2 are bolted together, approximately 0.25 inch apart, using nonconductive ¼ 20 nylon bolts and nuts. Again, these sizes are for illustrative purposes and can vary to suit particular production goals.

The aluminum plate assembly 1 is then attached to electrical connections 4 which are connected to a voltage source. The aluminum plate assembly 1 is then placed in a vat of water (not shown). For the purpose of this example, the vat of water would be approximately 50 gallons. The two outside aluminum plates 2 are connected to the positive and negative terminals of a low voltage DC power source. In this example, the low voltage DC power source is a commercially available twelve volt battery (not shown). The battery may also be attached to a commercially available battery charger (not shown) to maintain proper voltage. The power source is then activated via a commercially available switch (not shown) to provide voltage to the aluminum plate assembly 1 which is then energized for approximately 24 hours. It has been found that the generation of the slurry can be made more efficient by periodically reversing polarity. In this example, switching the polarity approximately every 12 hours would improve the efficiency which the aluminum plates 2 are dissolved. The voltage polarity can be switched by manually reversing the battery leads, or by using commercially available switches (not shown) to reverse the polarity of the supplied DC voltage. Likewise, in large-scale industrial production voltage regulation and polarity switching would preferably be automated and controlled by programmable devices.

An advantage provided by the invention is that a low voltage used to create the slurry uses a minimal amount of power. As a result, an insignificant amount of heat is produced, and the cost of powering slurry production is minimized. Further, the aluminum particles produced by this process and extracted from the aluminum plates 2 are microscopic.

Experimentation with a wide variety of voltage levels and frequencies has been made. It is been found that a low voltage DC power source, such as a 12 V DC battery or DC power supply is more effective than higher level voltages, and more effective than AC voltage. Of course, variations in voltage level can be made. However, low voltage DC has been found to be more efficient than higher low-voltage levels, or AC voltage.

In this example, the process produces approximately 15 gallons of liquefied aluminum slurry from the 50 gallon tank of water. In practice, excess water is drained periodically to condense the aluminum slurry. A byproduct of the process is the production of hydrogen gas. It has been found that periodic stirring of the water will release hydrogen molecules attached to the aluminum particles which allows the aluminum particles to sink to the bottom of the water. The hydrogen gas is a byproduct of the process which may also be captured and used as an additional commercially valuable product. As noted above, removal of the hydrogen from the tank results in the aluminum particles sinking. This separates the aluminum particles from the water to facilitate any drainage of excess water.

The liquefied aluminum is then strained and bottled to be used for treatment of contained water systems, such as lined Koi ponds and aquariums. The resulting aluminum slurry is a liquid that has the appearance of heavy cream. During use, a user would merely shake the bottle containing the slurry to thoroughly mix it, and then pour in a predetermined amount based on the size of the contained water system.

Those skilled in the art will realize that while the example presented above illustrates the principles of the invention, the sizes and amounts used would likely change when the process is used industrially. In particular, the system can easily be designed such that it runs on a continuous and automated basis. Large aluminum plates, having any desirable size and shape can be used in conjunction with any size water tank that is suitable for commercial use. The application of DC voltage can also be done on an automated basis, and further, it can be controlled via a programmable device to maximize efficiency and automation. Power levels can also be automated in this manner.

As a result of using the aluminum slurry, phosphorous, microbes, and dissolved organic carbon is removed from the water. In addition, the ammonia, nitrite, nitrate and pH levels in the water are stabilized to normal levels. Removal of the phosphorous starves the algae which was creating the problem, and in addition, the flocculation helps remove waste through the water filtration system. As a result, the water is clarified, and unpleasant odors are illuminated.

A unique feature of the invention is that the aluminum particles produced by this process are at microscopic levels which allow them to freely float in the water. This improves the rate at which the aluminum comes in contact with phosphates and other undesirable materials. The microscopic particle size also allows the aluminum to freely pass through water filtration systems prior to flocculation.

Another unique feature of the invention is that the selection of a proper voltage has a substantial impact on the efficiency of the process. It has been found that low voltage DC is more effective than other DC voltage levels, and more effective than AC voltage.

The aluminum slurry produced by this process is convenient in that it can be conveniently packaged in a container. During use, the user only needs to shake the container, measure, and then pour the slurry into the body of water. It requires no skill on the part of the user for effective use.

The process of producing the aluminum slurry has another important advantage in that the byproducts of the process are hydrogen and oxygen. As a result, there are no pollution problems associated with the method used by this invention.

While specific embodiments have been discussed to illustrate the invention, it will be understood by those skilled in the art that variations in the embodiments can be made without departing from the spirit of the invention. Therefore, the invention shall be limited to the scope of the claims.

I claim:

1. A method of clarifying water by removing phosphorus based contaminants, including the steps of:
    adding a liquified aluminum slurry containing microscopic aluminum particles that are sized small enough to pass through a water filtration filter, to a contained body of water that is contaminated with phosphorus, phosphorus based compounds or phosphates, wherein the slurry mixes with the body of water and is distributed throughout the body of water; and
    clarifying the water by combining the aluminum particles with phosphorus, phosphorus based compounds or phosphates such that the phosphorus, phosphorus based compounds or phosphates combine with the aluminum particles to form larger particles which float to the surface of the body of water, sink to the bottom of the body of water, or are trapped in said filter.

2. A method, as in claim 1, including the additional step of:
    circulating the aluminum particles in the contained body of water.

3. A method, as in claim 2, wherein:
    the aluminum particles, once combined with phosphorus, phosphorus based compounds or phosphates, form particles that are large enough to be trapped when passing through the filter.

4. A method, as in claim 2, including the additional step of:
    forming the aluminum slurry by submerging a plurality of aluminum plates in water, and applying electrical charges to opposing plates.

5. A method, as in claim 4, including the additional step of:
    using a low-voltage DC charge as the electrical charge; and
    reversing the polarity of the low-voltage DC charge at predetermined time intervals.

6. A method, as in claim 5, wherein:
    the low-voltage DC charge is approximately 12 Volt DC.

7. A method, as in claim 1, wherein:
    the aluminum particles, once combined with phosphorus based compounds or phosphates, form particles that are large enough to be trapped when passing through a filter.

* * * * *